US008684700B2

(12) United States Patent
Carson-Rowland (10) Patent No.: US 8,684,700 B2
(45) Date of Patent: Apr. 1, 2014

(54) METHOD AND APPARATUS FOR WASTE WATER LEVEL INDICATION

(76) Inventor: Stephen Carson-Rowland, Brisbane (AU)

( * ) Notice: Subject to any disclaimer, the term of this patent is extended or adjusted under 35 U.S.C. 154(b) by 565 days.

(21) Appl. No.: 13/031,211

(22) Filed: Feb. 19, 2011

(65) Prior Publication Data

US 2011/0203686 A1     Aug. 25, 2011

Related U.S. Application Data

(60) Provisional application No. 61/305,984, filed on Feb. 19, 2010.

(51) Int. Cl.
*F04D 15/00* (2006.01)
*G01F 23/24* (2006.01)

(52) U.S. Cl.
USPC .......................................... 417/36; 73/304 R (58) Field of Classification Search
USPC ........................... 137/392; 73/304 R; 417/36
See application file for complete search history.

(56) References Cited

U.S. PATENT DOCUMENTS

| | | | | |
|---|---|---|---|---|
| 3,515,000 A | * | 6/1970 | Baumoel | 73/304 R |
| 3,911,744 A | * | 10/1975 | Edwards | 73/304 R |
| 4,203,325 A | * | 5/1980 | Cowles et al. | 73/304 R |
| 4,244,385 A | * | 1/1981 | Hotine | 417/36 |
| 4,637,424 A | * | 1/1987 | Morgan, III | 137/392 |
| 4,646,569 A | * | 3/1987 | Cosser | 73/304 R |
| 4,652,811 A | * | 3/1987 | Kwiat et al. | 73/304 R |
| 4,739,786 A | * | 4/1988 | Parkinson | 137/392 |
| 7,021,137 B1 | * | 4/2006 | Milone | 73/304 R |
| 7,284,427 B2 | * | 10/2007 | Calabrese | 73/304 R |
| 7,490,513 B2 | * | 2/2009 | Salzmann et al. | 73/304 R |
| 7,597,116 B2 | * | 10/2009 | Detwiler | 417/36 |
| 2009/0082977 A1 | * | 3/2009 | Parkinson | 702/55 |

FOREIGN PATENT DOCUMENTS

FR     2638521 A1 *    5/1990    ................ 73/304 R

* cited by examiner

*Primary Examiner* — John Rivell
(74) *Attorney, Agent, or Firm* — Stephen E. Zweig (57) ABSTRACT

Disclosed is a liquid level indicator suitable for use with an electrical power source comprises: a liquid level indication rod at least partially immersed in the liquid, the liquid level indication rod including a plurality of electrical contacts disposed on a surface of a non-conductive material; a level indicator transmitter in electrical communication with the liquid level indication rod and with the electrical power source, the level indicator transmitter functioning to measure current flow from each of the plurality of contacts to a ground in the liquid so as to determine which of said plurality of electrical contacts lie beneath a surface of the liquid.

3 Claims, 9 Drawing Sheets

METHOD AND APPARATUS FOR WASTE WATER LEVEL INDICATION

CROSS REFERENCE TO RELATED APPLICATION

The present application is related to Provisional Patent Application entitled "Method and apparatus for waste water level indication" filed 19 Feb. 2010 and assigned Ser. No. 61/305,984, incorporated herein by reference in its entirety.

FIELD OF THE INVENTION

This invention relates broadly to waste water management, and more specifically to water level control devices used in waste water pump stations.

BACKGROUND OF THE INVENTION

Waste water is generated from common sources, such as homes, schools, restaurants, hotels, office buildings, and the like. From these sources, waste water enters a collection system and is gravity fed downstream through underground sewer pipes to a municipal treatment plant where the waste water is chemically and biologically treated for return to the environment. Collection basins containing one or more waste water pumps are located in areas of low elevation between the sources of waste water and the treatment plant.

A pump station is generally constructed of concrete or fiberglass, and is typically between four to twelve feet in diameter, and can range from four to over forty feet deep. The pump station receives the flow of waste water from the gravity sewer pipes that feed it. The pump station also houses one or more discharge pumps that serve to "push" the waste water to another high point, or directly to the treatment plant. Depending on the plant location, multiple pump stations may be required to transport the waste water to its final destination for treatment.

Each pump station has some means of signaling when the discharge pumps should turn "on" and "off" depending on the level of waste water in the basin. Most commonly, this signaling means comprises four float switches staggered at different elevations in the basin. These floats are wired back to a central control panel that houses the motor starters for the pumps. Depending on which of the floats "tips" determines which of the pump motors energizes, when it "de-energizes", and when there is a "high water" or "low water" condition.

Waste water entering these pump stations typically conveys many contaminants along with the water—in particular, fats, oils and grease (FOG). As waste water stored in the pump station becomes stagnant, most of this FOG rises to the surface and solidifies. This FOG tends to collect on, and build-up around, anything it touches. It is particularly common for grease to collect on the aforementioned floats that control the operation of the pumps. When grease collects on a float, it can weigh the float down or hold it in one position. By not allowing the float to "tip," operation of the associated electrical switch is restricted, which in turn, affects automatic operation of the pump. Also, grease may "bridge" from a float to a pipe or other structure in the pump station, and the float may "stick" in the "up" position. When this happens, the pump motor never gets its signal to turn off, and continues to run even after there is no waste water remaining in the basin. In this event, the motor overheats causing substantial and costly mechanical damage to the pump.

Other methods of waste water level measurement include the measurement of electrical conductivity, as water is a conductive liquid. One method of conductivity utilizes a rod having a plurality of metal contacts on the rod, the rod being located in the pump station. Each rod contact is connected to a unit in the control panel which applies a low AC voltage to each contact and checks each for a current to ground above a certain user-defined threshold. Thus, the level in the well can be determined depending on the number of contacts allowing current to flow to ground.

As can be appreciated, when FOG and other waste material builds up on the rod the waste materials can form an imperfect electrical seal that bridges one or more of the metal contacts. The waste material bridge serves to retain liquid, and thus enables an electrical connection between the metal contact and ground. This bridge-like structure of the waste material can continue to hold liquid in suspension. Or, after the water level has dropped and the bridge has somewhat dried out, capillary action may bring liquid from rising waste water up through the waste material. In either of these cases, once the liquid in the well has risen up to the bottom of the waste material bridge, an electrical path capable of conducting the electrical measurement current will be created between ground and all of the metal contacts the waste material has formed over. So the electronic unit may detect a false level—higher than the actual waste water level.

Therefore, when a lower contact is covered with liquid, it also provides an electrical path to a higher contact. This condition produces a false reading and "short cycling" of the pumps in that a waste water pump will begin operation sooner than it normally would. The result is that the waste water pumps cycle on and off more frequently than needed, leading to both short-term and long-term pump problems.

A similar problem occurs with the conductivity device as FOG builds up on the rod, especially around the contact which corresponds to the pump starting. This is because it is the highest level that is usually reached in the pump station. As the FOG is non-conductive it can prevent an electrical current from flowing even when the liquid level reaches the same level as this contact. In this case, the level will keep rising until a higher contact is reached, but the same problem will eventually occur on this higher contact. In this scenario, the pump motor may not activate to transfer the rising waste water from the pump station further downstream towards the treatment plant. As a result, the pump station may go into an "alarm" state, and can overflow onto the ground around the well, and into a nearby creek or stream.

All of these problems noted with conductivity devices require that the apparatus be cleaned with some frequency. Unfortunately there is no clear indication with existing devices whether or not cleaning is required, and as a large buildup sometimes has no detrimental effect the operators often clean the rod when it is not required.

Another shortfall of the conductivity device, and of floats, is that the level value is measured in steps. With ten contacts on a conductivity device, for example, there are at most only ten level "steps" that can be measured. Usually the rod is placed in the bottom half or bottom third of the well as this is where the pumps are ideally started and stopped. But once the water level progresses above the highest contact, or highest contact, on the rod, there is no way of knowing exactly what the level is. This is a problem in high level conditions as multiple wells may be in a high level condition. The operators need to know which station is most likely to overflow. And in variable speed drive (known as VSD or VFD) stations, which are becoming more common, even in the active range of the well the system needs an analog level reading, and not a stepped (discontinuous) level reading. VFDs do not work well with discontinuous "process variables."

BRIEF SUMMARY OF THE INVENTION

In one aspect of the present invention, a liquid level indicator suitable for use with an electrical power source comprises: a liquid level indication rod at least partially immersed in the liquid, the liquid level indication rod including a plurality of electrical contacts disposed on a surface of a non-conductive material; a level indicator transmitter in electrical communication with the liquid level indication rod and with the electrical power source, the level indicator transmitter functioning to measure current flow from each of the plurality of contacts to a ground in the liquid so as to determine which of said plurality of electrical contacts lie beneath a surface of the liquid.

In another aspect of the present invention, a waste water management system comprises: a wet well for collecting and holding waste water; a waste water pump disposed in the wet well; a liquid level indication rod including a plurality of electrical contacts disposed on a surface of a non-conductive material, the liquid level indication rod disposed in the waste water; and a control panel including control electronics in electrical communication with the liquid level indication rod, the control panel functioning to measure an electrical current value between at least one electrical contact and a ground point to provide a signal to said pump.

In yet another aspect of the present invention, a method for determining the level of water in a wet well comprises the steps of: providing a liquid level indicating rod in the wet well, the liquid level indicating rod having a plurality of spaced apart electrical contacts; monitoring current flow between at least one electrical contact and a ground point; and sending a signal to a pump control unit, the signal corresponding to the current flow value.

These and other features and advantages of the present invention will be more fully understood from the following detailed description with reference to the accompanying drawings.

DETAILED DESCRIPTION OF THE INVENTION

The present invention addresses the above problems by disclosing: (i) a method of detecting when waste material buildup will lead to "short cycling" so as to allow operators to ignore even a sizeable buildup until an alarm is activated; (ii) two methods of providing an analog signal from a conductivity device; (iii) a method of reducing problem buildup around contacts using an analog method; (iv) a method of reducing problem buildup around contacts by relying on the preparation of the conductive surface; and (v) a method whereby, using the techniques from an analog method, the apparatus can also determine conductivity of the liquid, which is of value to operators of waste water systems, identifying, for example, significant storm water infiltration versus normal municipal waste water.

The disclosed apparatus may also function to alert operators to the buildup of contaminants on the rod. In an exemplary embodiment, the apparatus may measure the time interval between any two contacts registering a level. If the time so measured is less than a predetermined value, the alarm may be activated.

In another exemplary method, the electrical resistance between contacts is measured. This electrical resistance measurement may be obtained by direct electrical measurement. Alternatively, the electrical resistance measurement may be obtained by comparing the two resistances from the contacts to ground. Due to the waste matter covering the metal contacts, the electrical connection between the two contacts will be reduced compared with a metal contact which has no waste matter.

As waste usually builds up around the metal contact which corresponds to the start point of the pump (e.g. typically a point halfway up the rod), the contacts near the bottom of the rod provide excellent comparisons. Accordingly, the innovative method responds to any buildup of waste matter by detecting the "short cycling" at the contacts resulting from the buildup. This detection may be made by resistance measurements obtained over a specified time interval, or by measuring changes in current flow or resistance at the rod contacts.

Figure 1:
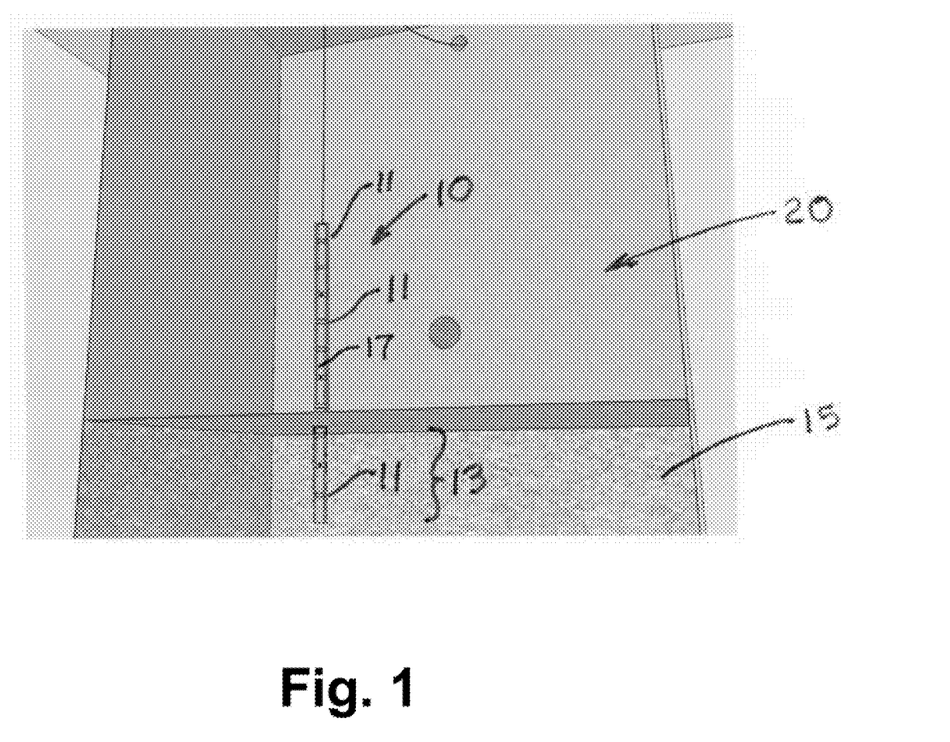
FIG. 1 is a diagrammatical illustration of a liquid level indication rod with circumferential electrical contacts, in accordance with the present invention, the liquid level indication rod hanging in a wet well, with the bottom three electrical contacts under the surface of the liquid.

FIG. 1 shows an exemplary embodiment of a liquid level indication rod 10 having ten circumferential bands functioning as electrical contacts 11. The electrical contacts are disposed about a non-conductive material 17, that may be fabricated from polyvinyl chloride (PVC) or other high-density plastic. The non-conductive material 17 is preferably configured as a substantially cylindrical rod. The electrical contacts 11 may be fabricated from a corrosion-resistant, high-grade metal. In a typical application, the liquid level indication rod 10 is suspended in a wet well 20, with a portion of the liquid level indication rod 10 having one or more electrical contacts 13 under water, in accordance with an aspect of the present invention.

An liquid level indication system (shown in FIG. 6) may be provided to test for current flow, or resistance, between each submerged electrical contact 11 to a grounded component or to earth ground. This current flow, or resistance, is dependent on a number of factors. These factors include: the surface area of the electrical contact 11 (i.e., the width and circumferential length), the material forming the electrical contact, the size and composition of the grounded component, the inherent conductivity of the waste water in the wet well 20, herein referred to as liquid 15, and the electrical conductivity of the liquid 15. Effectively, electric current flows through multiple parallel paths from the electrical contacts 11 to the grounded component or to earth ground.

Figure 2:
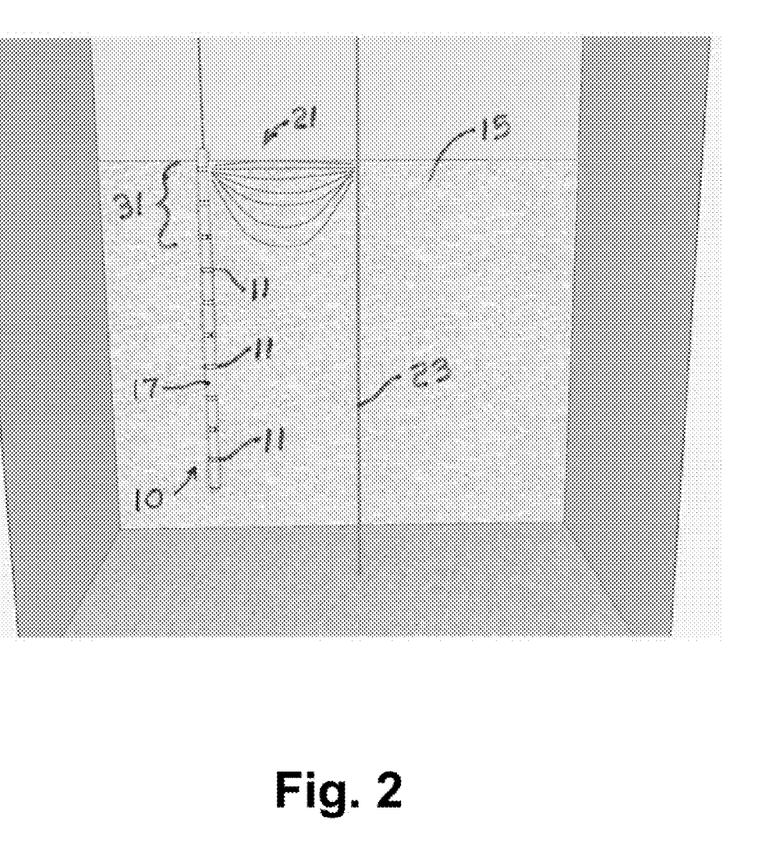
FIG. 2 is a diagrammatical illustration of the liquid level indication rod of FIG. 1 extending slightly from the well water, the illustration showing a set of lines representing an electric field emanating from the topmost rod contact to "ground," as current flows from the liquid level indication rod to a ground rod through the water in the well.

This can be seen more clearly in FIG. 2 in which a set of lines 21 represent an electric field 31 emanating from the topmost electrical contact 11 to a grounded component, as current flows through the liquid 15 from one electrical contact 11, to the grounded component. In an exemplary embodiment, the grounded component may comprise a ground rod 23, such as a chain, a metal pipe, or a metal ladder suspended in the wet well 20. The electric field 21, here represented by multiple paths extending between the topmost electrical contact 11 lying under the liquid 15 and the ground rod 23, can be envisaged like the magnetic field between two poles. It should be understood that each of the other electrical contacts 11 disposed on the portion of the liquid level indication rod 10 lying under the surface of the liquid 15 similarly has an electric field to the ground rod 23, where the other electric fields are not shown in the figure for clarity of illustration.

Figure 3:
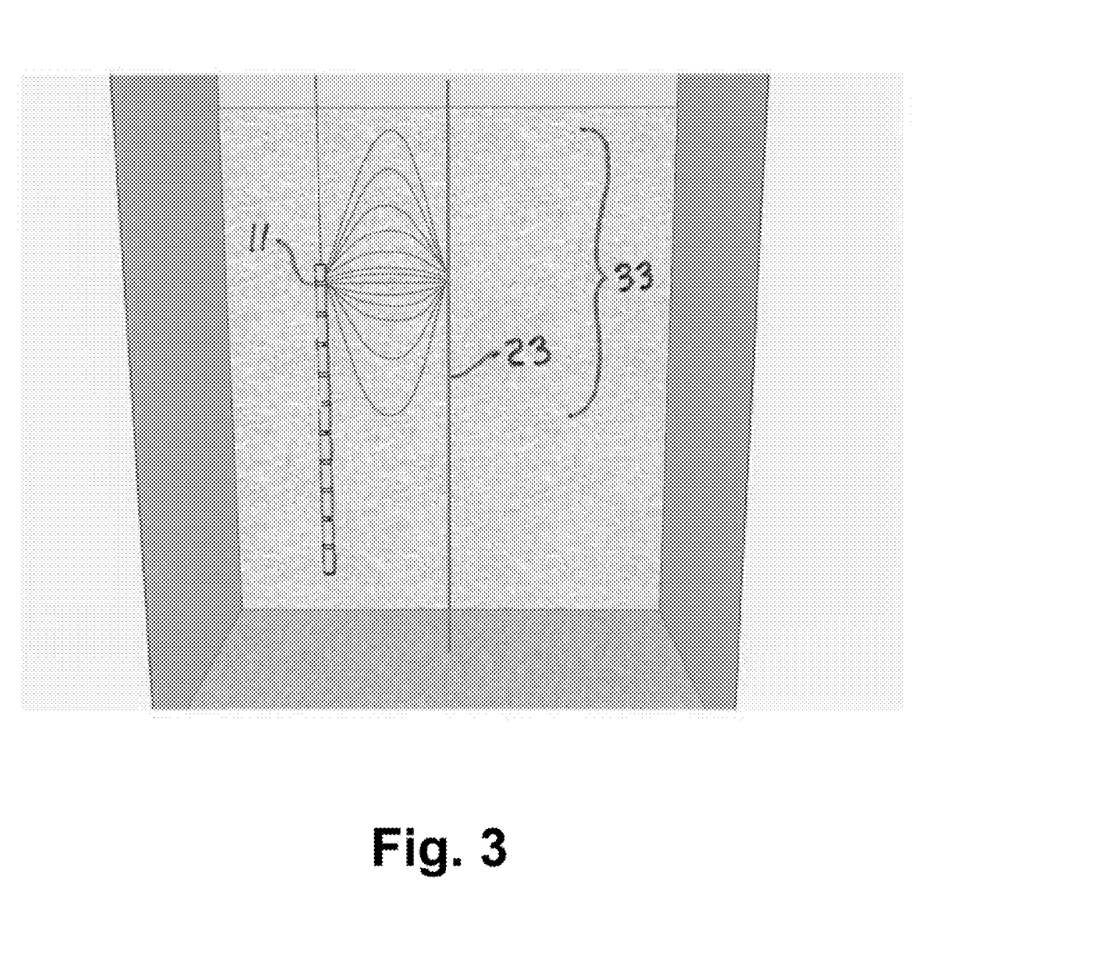
FIG. 3 is a diagrammatical illustration of the liquid level indication rod of FIG. 2 where the rod is more deeply submerged in the wet well water, the greater depth of the rod resulting in more electric field paths to the ground rod, reducing the effective resistance.

It can be appreciated that, as the level of the liquid 15 increases, as best seen in FIG. 3, the electric field 21 of FIG. 2 has correspondingly grown in extent, here represented by an electric field 33 having an increased number of conductive paths extending between the top electrical contact 11 and the ground rod 23. The number of parallel conductive paths in each of the other electric fields (not shown), that is, in the electric fields emanating from the other contacts 11 lying below the top contact 11 and the ground rod 23, are likewise increased. Consequently, the total resistance to the ground rod 23 is reduced, so long as the other variables are kept constant. This change in resistance, or corresponding increase in current flow, can then be used to remotely determine the level of the liquid 15 in the wet well 20.

In an "ideal case" the measured resistance would be similar to the resistance of a wire $$R = \rho L/A$$

where $\rho$ is the resistivity of the wire material, A is the cross-sectional area of the wire, and L is the length of the wire. However, in the physical case of a large body of liquid surrounding a contact on the rod and a length of conductive material connected to the grounded component, determining resistance is not simple. The calculation of resistance can usually be done by using numerical analysis to solve Maxwell's field equations.

In practice, the effect of the changes in water level is a very small, but measurable, change in resistance. At the same time, the inherent conductivity of the liquid varies over time more due to the changing composition of the liquid in the well and the fluctuations in water temperature. Moreover, a problem arises because the inherent conductivity of the liquid may vary significantly over time. This happens due to the changing composition of the liquid in the well and the fluctuations in water temperature. The conductivity change may "swamp" the small resistance change. However, resistance is always proportional to the inverse of conductivity. Therefore, the conductivity of the liquid may be determined separately, using an optional set of conductivity contacts on an indication rod (see FIG. 7). The measured resistance value between a given contact and ground is divided by the resistivity (i.e., alternatively, multiplied by the conductivity). In this manner, the effect of changing temperature or changing liquid composition can be cancelled out. Accordingly, the analog water level in the well can be reliably calculated by using both the actual resistance measurement and the conductivity measurement.

The resistance between an individual electrical contact 11 on the liquid level indication rod 10 and the ground rod 23 is a function of the surface area of the individual electrical contact 11. As the total surface area of the electrical contacts 11 that lie under the surface of the liquid 15 increases, the resistance to the ground rod 23 is reduced, the resistance being a non-linear function of the aggregate areas of the individual electrical contacts 11 lying under the liquid 15. Therefore, as the level of the liquid 15 rises from (a) the bottom of a particular electrical contact 11, that is, at the point where the liquid 15 is just touching the particular electrical contact 11, to (b) the point where the liquid 15 completely covers the particular electrical contact 11, the resistance measurement determined at the remote control system will decrease continuously or, alternatively, the value of the current flow will increase continuously.

Figure 4:
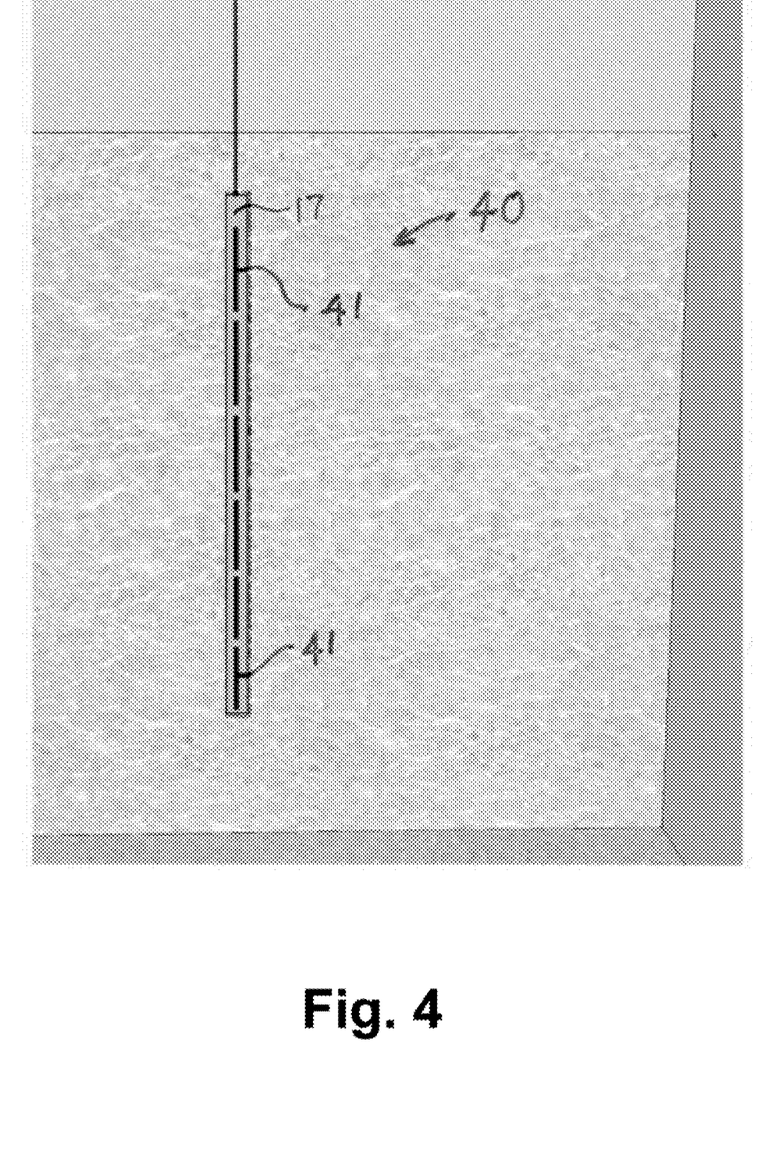
FIG. 4 is an alternative embodiment of a liquid level indication rod, wherein the liquid level indication rod includes multiple axial contacts.

FIG. 4 shows an exemplary method of implementing this procedure using a liquid level indication rod 40 comprising a plurality of linear, axial electrical contacts 41 disposed on the non-conductive material 17, so that the water level measurement can be a semi-continuous measurement. Depending on the particular manufacturing technique used, an alternative liquid level indication rod design may include one long axial contact. However, automatic calibration is preferably enabled by the use of multiple axial contacts. In yet another alternative exemplary embodiment (not shown), the axial contacts 41 may be staggered circumferentially about the surface of the liquid level indication rod 40 such that adjacent contacts 41 may be longitudinally positioned along the liquid level indication rod 40 so as to overlap along the length of the liquid level indication rod 40.

Figure 5:
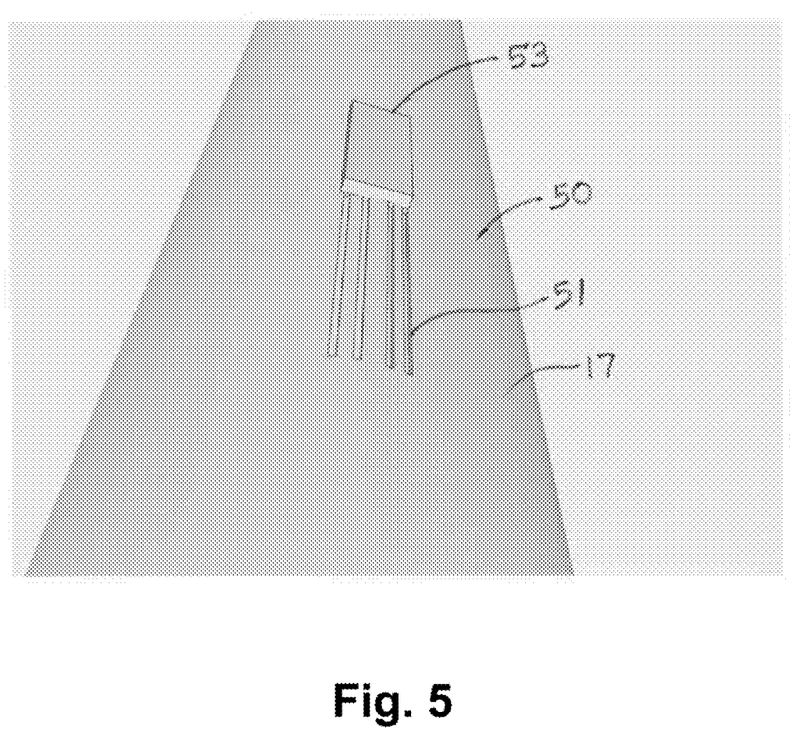
FIG. 5 is a diagrammatical illustration of a liquid level indication rod having grooves cut into the rod surface adjacent to a metal contact.

In another exemplary embodiment, a liquid level indication rod 50 may include one or more fine grooves 51 on the surface of the non-conductive material 17 to form a liquid level indication rod 50, as shown in FIG. 5. The fine grooves 51 may be disposed proximate the electrical contact 11 or 41, as described above. In an alternative exemplary embodiment, the fine grooves 51 may be disposed so as to terminate at a substantially rectangular metal contact 53, as shown in FIG. 5. This configuration makes it more difficult for fats, oils and greases to form a seal in the vicinity of the metal contact 53, while still allowing electric current to flow to the metal contact 53 in high FOG buildup situations. In the example provided, four grooves 51 are oriented in an axial, or longitudinal, direction, and cut into the rod surface adjacent to the metal contact 53. In an alternative exemplary embodiment (not shown), the grooves can be closed grooves orientated in a circumferential direction, or may be grooves disposed at an angle between the circumferential direction and the axial direction along the liquid level indication rod 50.

Conventional water-level systems based on electrical conductivity usually require the user to set a resistance (or conductivity) threshold. When the resistance between that contact and ground is below the threshold, the system determines that the contact is wet. However, in the disclosed apparatus, the user is not required to select an appropriate threshold, or to have a user-defined threshold. Rather, the disclosed apparatus functions by comparing the current flow through one contact with current flow through other contacts.

Figure 6:
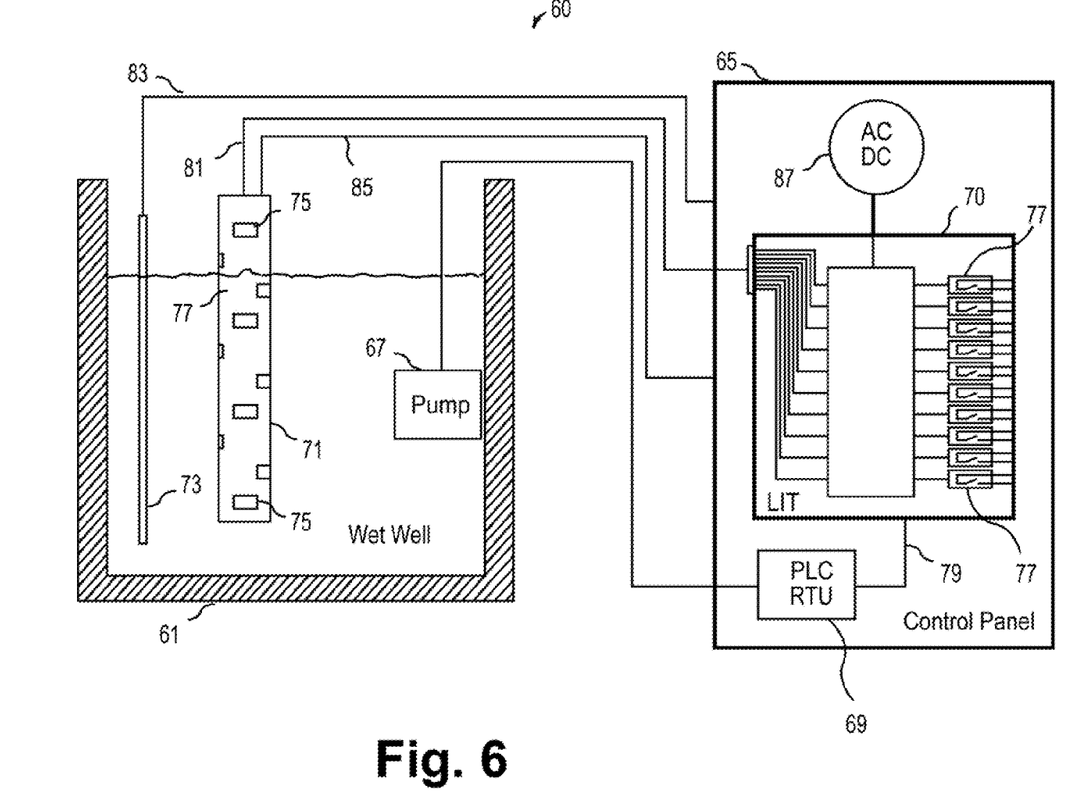
FIG. 6 is a diagrammatical system block diagram of a waste water management system incorporating the liquid level indication rod and ground rod of FIG. 3, 4, or 5 in the wet well.

There is shown in FIG. 6 a waste water management system 60, in accordance with an aspect of the present invention. The waste water management system 60 includes a wet well 61 in which the level of a liquid 63 is maintained within a predetermined range by a control panel 65. A pump 67 is provided in the wet well 61 and controlled by a pump control unit 69, which control unit may be implemented as a programmable logic controller or a remote telemetry unit, as is well known in the relevant art. The pump control unit 69 functions to turn the pump 67 on and off, in accordance with signals provided to the pump control unit 69 by a level indicator transmitter 70. The level indicator transmitter 70 functions by sensing the level of the liquid 63 in the wet well 61 via a submersible water level indicator rod, such as the water level indicator rod 71 shown in the illustration.

The water level indicator rod 71 includes ten, spaced-apart electrical contacts 75 disposed along the length of an electrically non-conductive rod 77. The individual electrical contacts 75 are each shorter than the circumference of the rod 77, and this allows for the plurality of electrical contacts 75 to be staggered at 120° intervals about the cylindrical surface of the rod 77. Alternatively, any of the liquid level indication rods 10, 40, and 50 can be used in place of the water level indicator rod 71. An electrical power source 87, which may be either AC or DC, supplies the current used by the level indicator transmitter 70 to determine which of the electrical contacts 75 are under the surface of the liquid 63. In addition, the electrical power source 87 supplies current to determine current flow between any two of the electrical contacts 75. A detection of such current flow between two adjacent contacts 75 may be an indication of waste material buildup in the region of the two contacts 75.

In an exemplary embodiment, the electrical power source 87 may provide low frequency (i.e., 50 to 400 Hz) electrical power of from about one to about thirty volts to enable the level indicator transmitter 70 to obtain reliable current measurements. Accordingly, the output from the level indicator transmitter 70 to the pump control unit 69 may comprise a current signal range, such as from (i) zero to 20 mA or (ii) 4 mA to 40 mA, Alternatively, the level indicator transmitter 70 may provide 'relay open' and 'relay closed' signals to the pump control unit 69. In response, the pump control unit 69 may respond by powering the pump 67 when the current level exceeds a specified value, or may power the pump 67 when a particular relay has closed (or opened).

As can be appreciated by one skilled in the art, level indicator transmitter 70 and the water level indicator rod 10, 40, 50, 71 can be adapted for operation in a waste water management system, as shown, or in any other system requiring an apparatus for sensing the level of a liquid in a container. There may also be provided a ground rod 73 suspended in the liquid 63, where the ground rod 73 may be grounded locally to the wet well 61, or may be electrically connected to and grounded at the control panel 65 by a ground wire 83, as shown.

An electrical indication wire bundle 81 provides electrical paths between the level indicator transmitter 70 and each of the ten electrical contacts 75 disposed on the non-conductive material 77 in the liquid level indication rod 71. An extra, eleventh electrical wire 85 may be included with the wire bundle 81 as a 'fail safe' component to indicate a possible break in the indication wire bundle 81. The level indicator transmitter 70 may function to activate or to shut off the pump 67 by means of providing a pump signal to the pump control unit 69 via an optional pump signal line 79. The pump signal may be generated by the level indicator transmitter 70, in accordance with predetermined operational criteria, as explained in greater detail below.

In the example shown, the top two electrical contacts 75 remain out of the liquid 63, and the bottom eight electrical contacts 75 are under water. The level indicator transmitter 70 includes ten relays 77, where each of the relays 77 is electrically connected to a corresponding electrical contact 75 by a conductor in the electrical indication wire bundle 81. The relays 77 can be of an either 'normally closed' or 'normally open' configuration. In the example shown, the relays 77 are normally open, and the two top relays 77 have remained open, because the two corresponding electrical contacts 75 on the water level indicator rod 71 remain above the liquid 63. The eight lower relays 77 have closed, because the corresponding eight electrical contacts 75 remain in the liquid 63.

Figure 7:
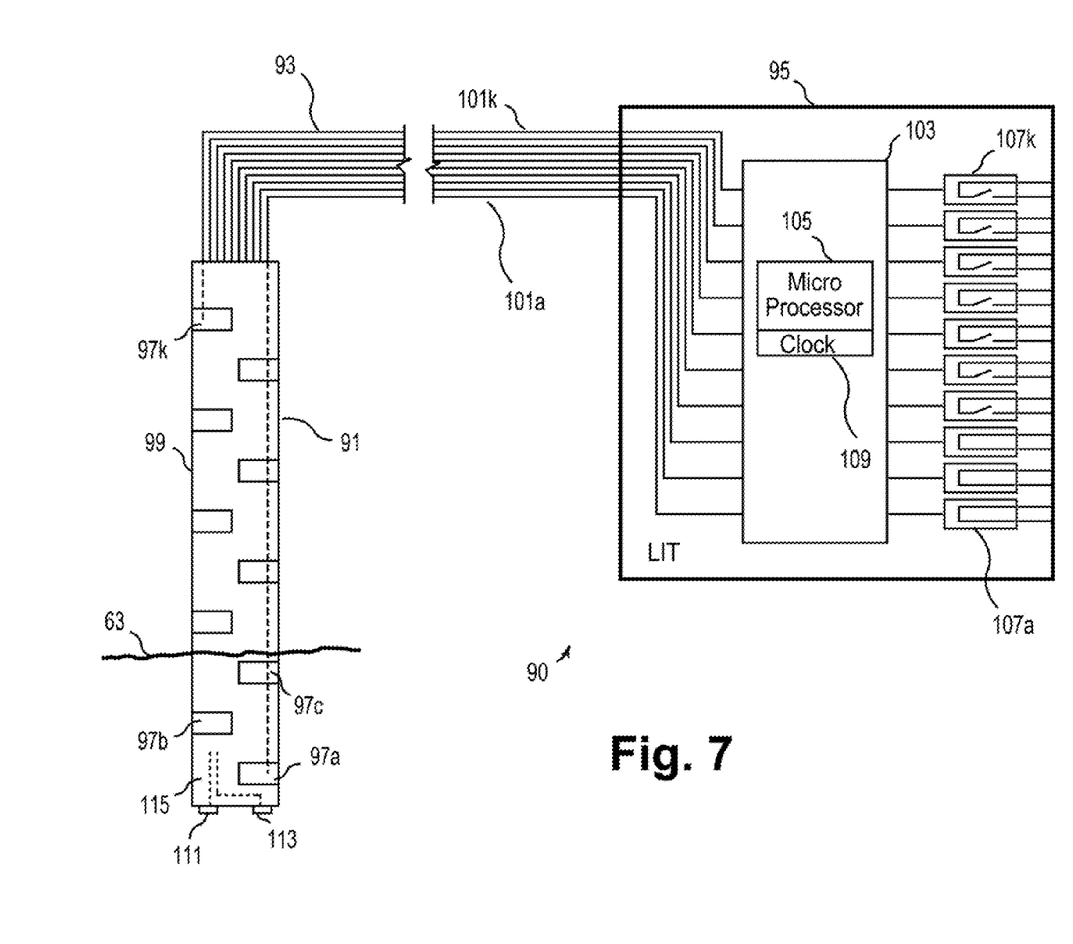
FIG. 7 is a diagrammatical block diagram of a liquid level indicator suitable for use in the waste water management system of FIG. 6.

There is shown in FIG. 7 an alternative exemplary embodiment of a liquid level indicator 90 comprising a liquid level sensing rod 91, a wire bundle 93, and a level indicator transmitter 95. The liquid level sensing rod 91 includes a plurality of ten electrical contacts 97 disposed along the length of an electrically non-conductive cylindrical rod 99. The wire bundle 93 includes one electrical wire, 101*a* through 101*k*, for each of the electrical contacts 97*a* through 97*k*, and may include an additional, 'fail safe' wire (not shown). In an exemplary embodiment, the liquid level sensing rod 91 may also include a pair of continuity contacts 111, 113 disposed at the bottom end of the liquid level sensing rod 91. A corresponding pair of electrical leads 115 run back to the level indicator transmitter 95 in the wire bundle 93 (the electrical leads 115 are not shown in the wire bundle 93 for clarity of illustration). The level indicator transmitter 95 may provide an electrical current to flow between the continuity contacts 111 and 113 so as to measure the electrical conductivity of the liquid 63, and thus obtain greater accuracy in the liquid level determination process. Alternatively, a conductivity meter (not shown) can be provided in the liquid 63 in place of the continuity contacts 111 and 113.

The level indicator transmitter 95 includes a level indicator module 103 and a plurality of relays 107*a* through 107*k*, where each relay 107 is electrically connected to a respective electrical contact 97 via an electrical wire 101. The level indicator transmitter 95 shown here is configured with 'normally open' relays 107. Accordingly, the lowermost three relays 107*a*-107*c* have closed because the corresponding three electrical contacts 97*a*-97*c* lie under the surface of the liquid 63. The level indicator module 103 includes a microprocessor 105 with an optional clock 109 to provide the sensing functions for the level indicator transmitter 95. The microprocessor 105 functions to determine the electrical reading resulting from the application of an electrical voltage to the plurality of electrical contacts 97. In an exemplary embodiment, the microprocessor provides a continual liquid level reading output for the level indicator transmitter 95. Accordingly, depending upon the application, the microprocessor 105 can provide a 'pump start' signal, where the pump start signal can be initiated when the liquid level reaches the location of a specified electrical contact 97, or at a location between electrical contacts 97.

In an exemplary embodiment, the level indicator module 103 may provide an analog output ranging from 4.0 mA to 20 mA. A current of 4.0 mA is used to indicate that the bottom electrical conductor 97*a* lies above the level of the liquid 63. When the electrical conductor 97*a* is under the level of the liquid 63, the analog output has increased to approximately 5.6 mA. Similarly, when the second electrical conductor 97*b* is under the level of the liquid 63, the analog output has increased to approximately 7.2 mA. When all the electrical conductors 97*a*-97*k* are under the level of the liquid 63, the analog output reaches the maximum value of approximately 20 mA.

Figure 8:
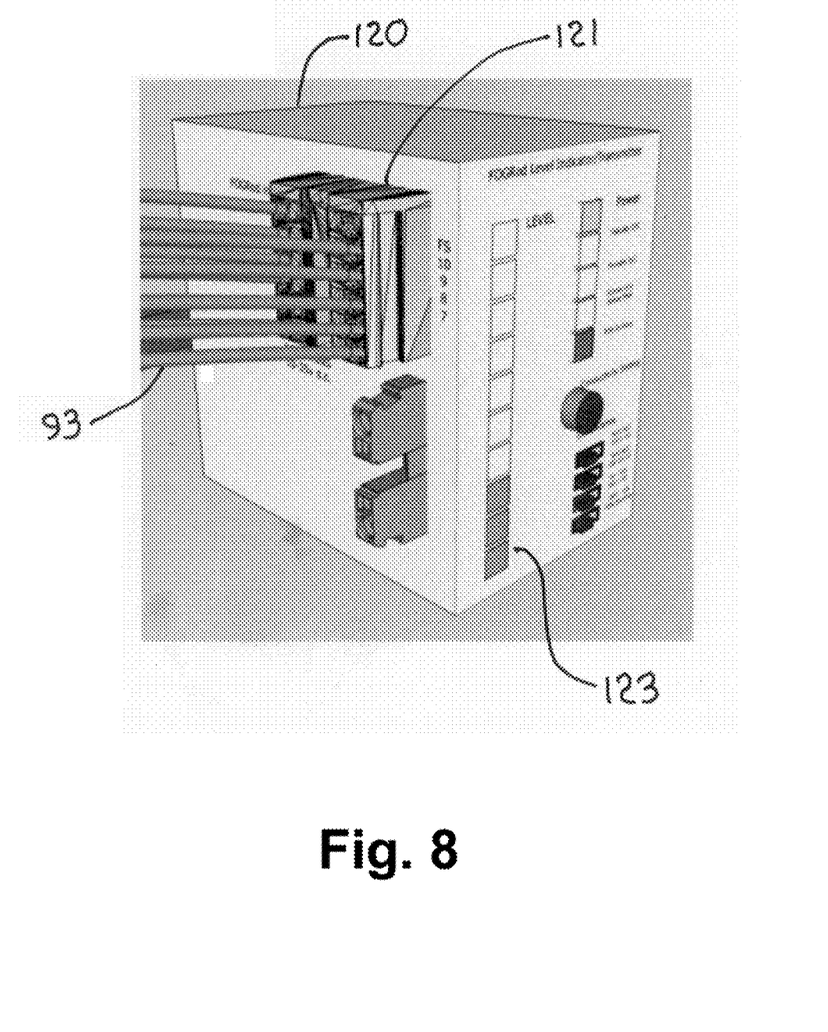
FIG. 8 is an isometric rendering of the liquid level indicator of FIG. 7.

In an exemplary embodiment, the level indicator transmitter 95 may be housed in a metal enclosure 120, shown in FIG. 8, with an electrical receptacle 121 configured to accommodate the wire bundle 93. The metal enclosure 120 may include a linear array of indicator lights 123 disposed on a front face to indicate the level of the liquid 63 in the corresponding wet well.

Figure 9:
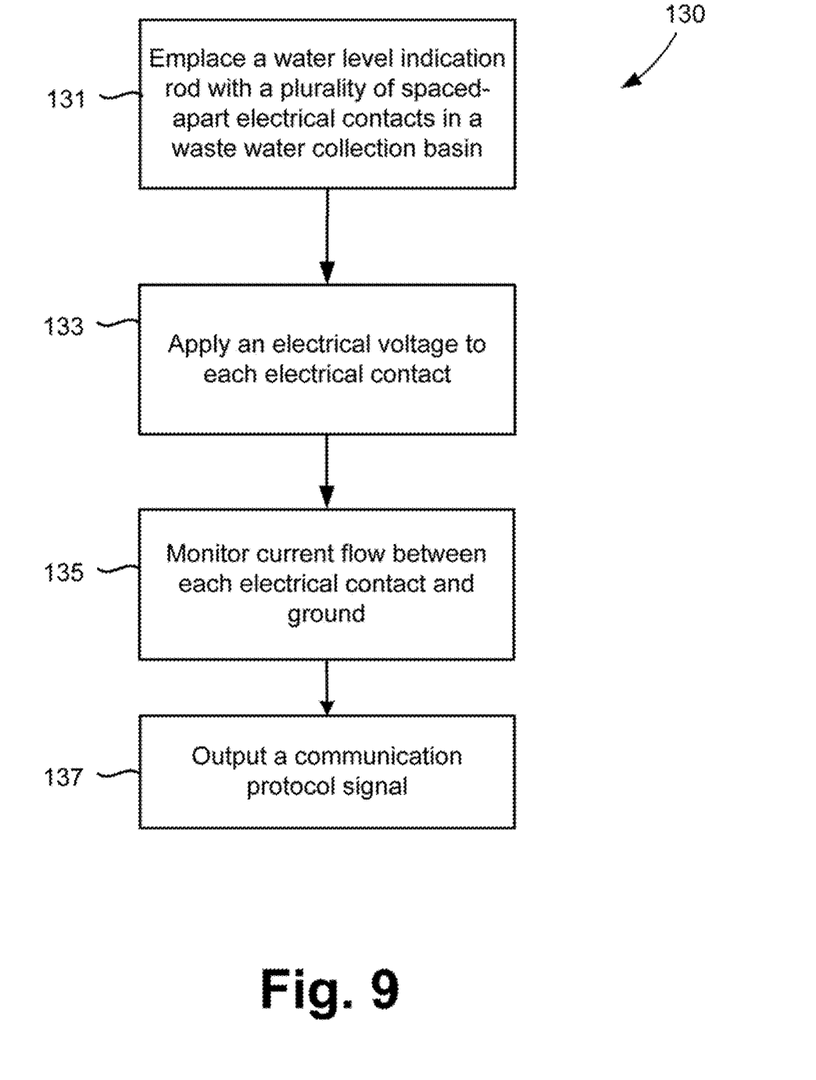
FIG. 9 is a flow diagram used in explaining operation of the liquid level indicator of FIG. 6.

Liquid level determination may be made in accordance with a flow diagram 130, in FIG. 9, in which a liquid level indication rod, such as any of liquid level indication rods 10, 40, 50, 71, or 91 is provided in a waste water collection basin such as the wet well 61 of the waste water management system 60, at step 131. For waste water management applications, the length of a liquid level indication rod may be from about five feet (1524 mm) to about 7.5 feet (2286 mm) with a diameter of about 35 mm. An electrical voltage is applied to each of the electrical contacts on the liquid level indication rod 10, 40, 50, 71, or 91 so as to generate an electrical detection current, at step 133. This current is monitored for each of the electrical contacts, at step 135, and a corresponding signal is provided to the pump control unit 69, at step 137.

In addition to the above-described monitoring function, the level indicator transmitter 70 can monitor and compare the current flow or resistance for adjacent electrical contacts so as to obtain a corresponding current flow or resistance differential reading as a method of determining whether there has been an accumulation of waste material on the liquid level indication rod.

In an exemplary embodiment, we can define $I_1$ as the current through the bottom electrical contact, define $I_2$ as the current through the second electrical contact from the bottom, and define $I_3$ as the current through the third electrical contact from bottom. As the level of the liquid 15 falls, a particular electrical contact is deemed to be dry if, for example, $I_3 < (I_1 + I_2)/3$. And as the level of liquid rises, the same electrical contact is deemed to be wet if, for example, $I_3 > (I_1 + I_2)/5$. This provides some degree of hysteresis in the disclosed system.

Hysteresis is advantageous because, when the water level is decreasing, the rod is more likely to have liquid still attached above the actual water level due to the high surface tension of water. The water attached above the actual water level can still have some electrical effect and provide an erroneous reading. Therefore, the threshold for current flow needs to be set higher when the level is falling. The threshold for the bottom contact may be based on the last values of the currents through the contacts above.

The above values are simply examples of one mathematical approach. In an alternative exemplary embodiment, the system may continuously calculate the relationships between the different currents and estimate the best coefficients for wet/dry during rising and falling water levels.

In yet another exemplary embodiment of the invention, the system obtains one or more conductivity measurements, and provides that data to the user through communications or annunciation. This may serve to assist the operators with the identification of high storm water inflow, for example, the high storm water inflow determination made as a low conductivity reading of the liquid, and may further provide some indication of the pH of the liquid. Varying pH has dramatic impacts on the corrosion of the concrete, steel and other materials in the waste water collection system and the only measurements currently made are at the treatment plant. Knowledge of the approximate pH at different points through the system is very beneficial.

Generally stated, continuous water level measurement is made possible because increasing water level allows more current to flow between a given contact and ground. That is, the more the liquid level increases, the "more" field lines, or parallel paths, are available. The conductivity (or a proxy for conductivity) may be calculated by using two closely adjacent sensors or metal contacts. This is necessary as a reference point because it is another variable that affects resistance. Once the liquid level indication rod is configured to detect continuous level, there is no need to have the start point at an electrical contact point. Advantageously, most buildup occurs at a "start point," that is, the highest level the waste water in the wet well normally reaches. As the conductivity between an electrical contact and a ground connection is a function of the area of the electrical contact, and of the grounding component, a non-linear functional relationship may result.

Many of the specific details of certain embodiments of the invention are set forth in the above description and related drawings to provide a thorough understanding of such embodiments. One skilled in the art will understand, however, that the present invention may be practiced without several of the details described in the above description. Moreover, in the description, it is understood that the figures related to the various embodiments are not to be interpreted as conveying any specific or relative physical dimension.

What is claimed is:

1. A waste water management system comprising:
a wet well for collecting and holding waste water;
a waste water pump disposed in said wet well;
a liquid level indication rod including a plurality of electrical contacts disposed on a surface of a non-conductive material, said liquid level indication rod disposed in said waste water; and a control panel including control electronics in electrical communication with said liquid level indication rod, said control panel functioning to measure an electrical current value between at least one said electrical contact and a ground point to provide a signal to said pump;
further comprising a pair of conductivity contacts disposed on said liquid level indication rod, said conductivity contacts in electrical communication with said control panel.

2. A liquid level indicator suitable for use with an electrical power source, said liquid level indicator comprising:
a liquid level indication rod at least partially immersed in the liquid, said liquid level indication rod including a plurality of electrical contacts disposed on a surface of a non-conductive material;
a level indicator transmitter in electrical communication with said liquid level indication rod and with the electrical power source, said level indicator transmitter functioning to measure current flow from each of said plurality of contacts to a ground in the liquid so as to determine which of said plurality of electrical contacts lie beneath a surface of the liquid;
wherein said liquid level indication rod further comprises a pair of continuity contacts on an outer surface, said continuity contacts being in electrical communication with said level indicator transmitter.

3. A liquid level indicator suitable for use with an electrical power source, said liquid level indicator comprising:
a liquid level indication rod at least partially immersed in the liquid, said liquid level indication rod including a plurality of electrical contacts disposed on a surface of a non-conductive material;
a level indicator transmitter in electrical communication with said liquid level indication rod and with the electrical power source, said level indicator transmitter functioning to measure current flow from each of said plurality of contacts to a ground in the liquid so as to determine which of said plurality of electrical contacts lie beneath a surface of the liquid; and further comprising a plurality of substantially linear grooves in said non-conductive material, said linear grooves disposed proximate at least one said electrical contact.

* * * * *